No. 623,245. Patented Apr. 18, 1899.
M. HAMILTON.
BICYCLE RACK.
(Application filed Feb. 24, 1898.)
(No Model.)
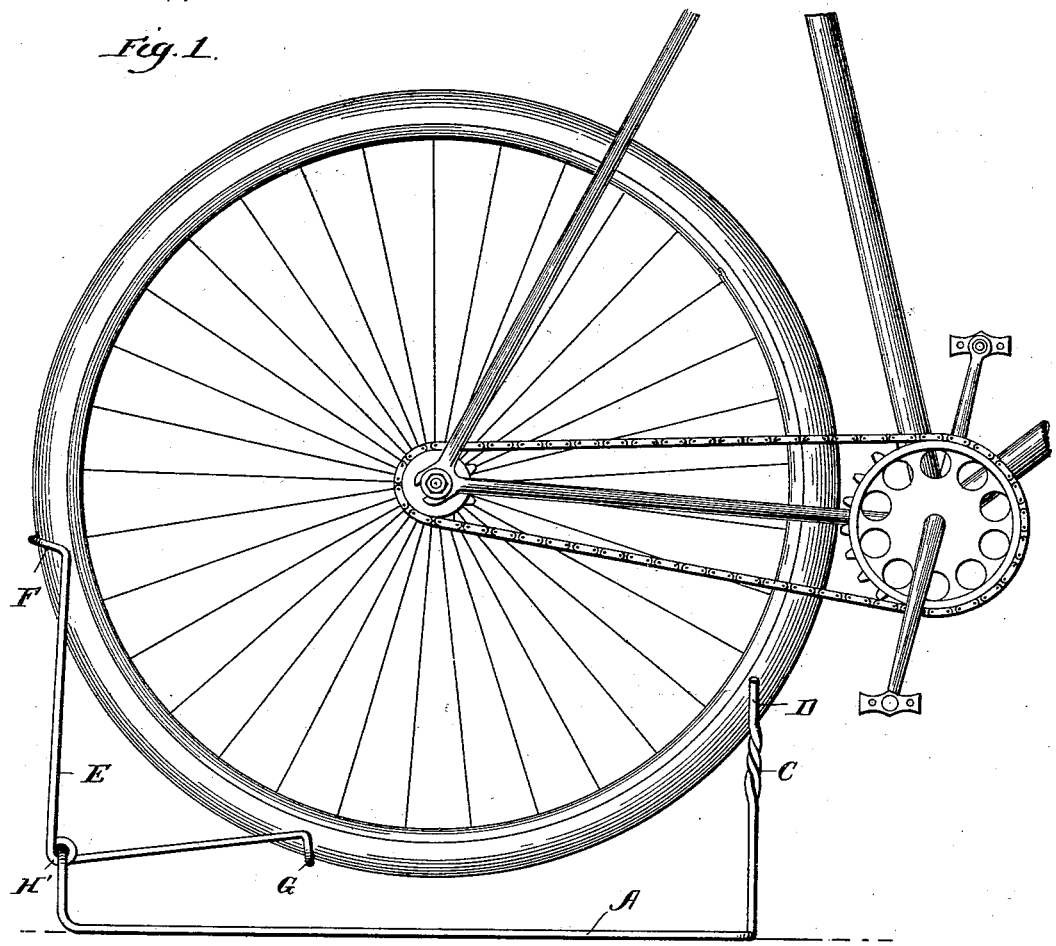
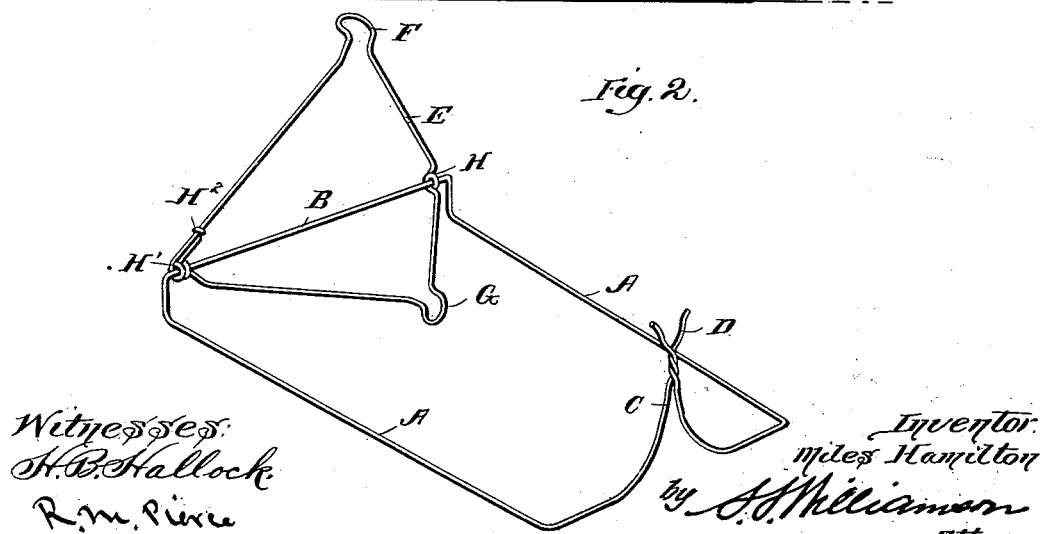
Witnesses:
H. B. Hallock.
R. M. Pierce.
Inventor
Miles Hamilton
by A. S. Williamson
Attorney

UNITED STATES PATENT OFFICE.

MILES HAMILTON, OF AUBURN, NEW YORK, ASSIGNOR OF ONE-HALF TO J. H. CROUSE, OF SAME PLACE.

BICYCLE-RACK.

SPECIFICATION forming part of Letters Patent No. 623,245, dated April 18, 1899.

Application filed February 24, 1898. Serial No. 671,484. (No model.)

*To all whom it may concern:*

Be it known that I, MILES HAMILTON, a citizen of the United States, residing at Auburn, in the county of Cayuga and State of New York, have invented a certain new and useful Improvement in Bicycle-Racks, of which the following is a specification.

My invention relates to a new and useful improvement in racks for bicycles, and has for its object to provide an exceedingly simple, cheap, and effective arrangement of this description in which one wheel of a bicycle may be placed, there being three points of contact with the wheel, two of which are movable in order that they may adapt themselves to the contour of the tire, and thus avoid cramping and yet firmly hold the bicycle in place.

A further object of my invention is to form the entire rack from two rods or pieces of wire.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1 is a side elevation of my improved rack, showing one of the wheels of a bicycle supported thereby; and Fig. 2, a perspective of the rack.

In carrying out my invention as here embodied the base is formed of a single rod or piece of wire which is so bent as to produce the parallel sections A, a raised cross-section B, and an upturned section C, which terminates in a fork or crotch D, formed by the two ends of this rod being twisted together and flared outwardly from each other, as clearly shown in Fig. 2. The adjustable member E is also formed from a single rod or piece of wire which is so bent as to produce the sockets F and G and is coiled at H, so as to form an eye, and the ends of this wire are again coiled at H', one end being secured to the other, as indicated at H², thereby hinging this member upon the cross-section B; but, if preferred, the ends of the adjustable member may be united by welding. From this description it will be seen that the two parallel sections A will rest upon the ground or floor and that when a wheel is placed within the rack the fork D embraces the tire at one point, while the sockets F and G adapt themselves to the tire at two other points, and the weight of the wheel brings about the adjustment of the member E, so that no care is necessary to properly place the wheel within the rack and prevent undue strains thereon at any point, yet when the wheel is once placed therein it is obvious that it will be firmly held, since the angular shape of the adjustable member renders it perfectly rigid laterally and the stationary fork adds to the stability.

The principal advantages of my improvement are its exceeding simplicity, its strength, and the small weight thereof, and it is to be noted that a comparatively wide base is produced by this particular construction, thereby overcoming any tendency of the bicycle to upset.

Having thus fully described my invention, what I claim as new and useful is—

In combination, a base formed of a single rod or piece of wire so bent as to provide parallel sections for contact with the ground, a cross-section in a higher plane than the parallel sections, the two ends of the rods being twisted together and flared outward to form a fork, an adjustable member also formed of a single rod or piece of wire so bent as to produce two sockets and eyes for hinging to the cross-section, the ends of this last-named rod being secured together, as specified.

In testimony whereof I have hereunto affixed my signature in the presence of two subscribing witnesses.

MILES HAMILTON.

Witnesses:
A. G. ADAMS,
HELEN M. WENDOVER.